United States Patent
Vince et al.

(10) Patent No.: US 9,227,127 B2
(45) Date of Patent: Jan. 5, 2016

(54) MARTIAL ARTS TRAINING APPARATUS

(75) Inventors: Richard Vince, Harleston Norfolk (GB); Andrew Woodhead, Dubai (UA)

(73) Assignee: RICHARDVINCE.COM LIMITED (GB)

( * ) Notice: Subject to any disclaimer, the term of this patent is extended or adjusted under 35 U.S.C. 154(b) by 83 days.

(21) Appl. No.: 13/877,950

(22) PCT Filed: Sep. 14, 2011

(86) PCT No.: PCT/GB2011/051717
§ 371 (c)(1),
(2), (4) Date: Apr. 5, 2013

(87) PCT Pub. No.: WO2012/046015
PCT Pub. Date: Apr. 12, 2012

(65) Prior Publication Data
US 2013/0203564 A1    Aug. 8, 2013

(30) Foreign Application Priority Data

Oct. 6, 2010  (GB) .................................... 1016826.8

(51) Int. Cl.
*A63B 69/20* (2006.01)
*A63B 69/00* (2006.01)
(Continued)

(52) U.S. Cl.
CPC ............ *A63B 69/20* (2013.01); *A41D 13/0015* (2013.01); *A63B 69/004* (2013.01); *A63B 69/26* (2013.01); *A63B 69/34* (2013.01); *A63B 71/081* (2013.01); *A63B 71/12* (2013.01); *F16M 13/02* (2013.01); *A63B 71/1225* (2013.01); *A63B 2071/1208* (2013.01); *A63B 2071/1241* (2013.01); *A63B 2071/1258* (2013.01); *A63B 2225/62* (2013.01)

(58) Field of Classification Search
CPC ......... A63B 69/20; A63B 69/24; A63B 69/34
USPC ................................... 482/83, 86–89
See application file for complete search history.

(56) References Cited

U.S. PATENT DOCUMENTS 3,755,820 A * 9/1973 Petrusek .............................. 2/18
3,831,941 A  8/1974 Pease
(Continued)

FOREIGN PATENT DOCUMENTS

FR     2266581     7/1974
GB     2461523     1/2010
GB     2463537     3/2010

OTHER PUBLICATIONS

International Search Report, European Patent Office, 3 pages.
(Continued)

*Primary Examiner* — Oren Ginsberg
*Assistant Examiner* — Gary D Urbiel Goldner
(74) *Attorney, Agent, or Firm* — Renner Kenner Greive Bobak Taylor & Weber

(57) ABSTRACT

Apparatus (10) for use in martial arts or fitness training, comprises a strike surface adapted to be kicked or punched by a user during training, and mounting means (12) adapted for removably securing the strike surface (11) to a structural element, such as a door frame. The mounting means (12) are shaped and dimensioned so as to receive the structural element, and comprise at least one inflatable bladder (16) adapted upon inflation to cause the mounting means (12) to grip the structural element.

14 Claims, 2 Drawing Sheets

(51) Int. Cl.
*A63B 69/26* (2006.01)
*A63B 69/34* (2006.01)
*A63B 71/08* (2006.01)
*A63B 71/12* (2006.01)
*A41D 13/00* (2006.01)
*F16M 13/02* (2006.01)

(56) References Cited

U.S. PATENT DOCUMENTS

| | | | |
|---|---|---|---|
| RE28,480 E * | 7/1975 | Petrusek | 2/18 |
| 3,958,801 A * | 5/1976 | Correa | 482/41 |
| 4,198,036 A | 4/1980 | O'Neal | |
| 4,266,298 A * | 5/1981 | Graziano | 2/22 |
| 4,596,106 A | 6/1986 | Kunczynski | |
| 4,714,289 A * | 12/1987 | Arzenti et al. | 294/119.3 |
| 5,060,641 A * | 10/1991 | Jones | 602/13 |
| 5,330,403 A | 7/1994 | Kuo | |
| 5,445,602 A * | 8/1995 | Grim et al. | 602/27 |
| 5,503,606 A | 4/1996 | Stephens | |
| 5,899,835 A | 5/1999 | Puranda | |
| 6,202,213 B1 * | 3/2001 | Georgick | 2/18 |
| 6,488,323 B1 | 12/2002 | Bouligny | |
| 2008/0188360 A1 | 8/2008 | Chu | |

OTHER PUBLICATIONS

U.K. Search Report, Intellectual Property Office, 5 pages.

* cited by examiner

MARTIAL ARTS TRAINING APPARATUS

MARTIAL ARTS TRAINING APPARATUS

This invention relates, in a first aspect, to apparatus for use in martial arts or fitness training. In particular, it relates to portable apparatus adapted to be removably mounted on a door frame or similar structural element. In a second aspect, the present invention relates to mounting means suitable for removably mounting apparatus on a door frame or similar structural element.

Training apparatus such as punch bags and the like, which are designed to be punched and/or kicked by a user for boxing, martial arts, and general fitness training, are well known. Such apparatus generally comprises a strike surface carried on a generally cylindrical or global shaped bag or ball. Conventionally, the bag or ball is either supported on an upstanding post having a weighted base, on a framework structure, or on a strong fixing point securely, and usually permanently, attached to a wall, ceiling or other structural element.

The above arrangements are utilised both in training gyms and in the home. However, none of these known arrangements are suitable where space in the home is limited, nor are any of the known arrangements suitable for use as a portable training device, due to the weight of the constituent components, and the space required to store the apparatus when not in use.

The present invention seeks to address the above issues by providing lightweight and space-saving apparatus which can be quickly and easily deployed and securely, but removably, mounted on a structural element within a building, for the performance of martial arts or fitness training exercises involving a user punching and/or kicking the apparatus. It is also envisaged that the mounting means developed as an integral part of the present invention may also find use in a wide range of other applications where it is desired removably to secure apparatus to a structural element.

According to a first aspect of the present invention there is provided apparatus for use in martial arts or fitness training, comprising:
    a strike surface adapted to be kicked or punched by a user during training; and
    mounting means adapted for removably securing the strike surface to a structural element, said mounting means being shaped and dimensioned so as to receive said structural element, and comprising at least one inflatable bladder adapted upon inflation to cause said mounting means to grip said structural element.

The strike surface is preferably three-dimensional, and most preferably has a generally cylindrical or global profile. In this way, the apparatus of the present invention may adopt the familiar shape of conventional punch bags or balls, shaped so as generally to imitate the shape of the human body or head.

The apparatus according to the present invention may be adapted for mounting on substantially any structural element. However, it is preferred that the invention be adapted for mounting on a door frame, and most preferably on a door jamb. In practice, the apparatus will generally be mounted over a door jamb and part of the adjoining wall.

In a first major embodiment of the present invention:
    the mounting means further comprises a pair of opposed gripping members adapted to grip said structural element therebetween, and a gap defined between the gripping members, and
    at least one of the gripping members comprises an inflatable bladder adapted upon inflation to cause said gripping member to expand into the gap, thereby to grip said structural element.

To accommodate substantially all conventional door jambs, the gap preferably has a width of substantially 260 mm.

Whilst the apparatus of the present invention may be constructed with only one of the gripping members having an inflatable bladder, it is preferred that each gripping member comprises an inflatable bladder. In use, the inflatable bladders may thus be inflated so as each to expand into the gap, and to urge against either side of a door jamb or other structural element located in said gap.

The origins of this feature of the present invention lie partially in the surprising discovery that sufficient force to enable the apparatus to remain in position when mounted on a structural element—even when the apparatus is being subject to the extreme forces associated with being punched or kicked by a martial arts master—may be attained simply by inflating the or each bladder according to one of these methods.

It is further preferred that at least one, and preferably each, gripping member is provided with a high friction surface to facilitate gripping of the structural element.

The mounting means may further comprise a generally rigid mounting bracket shaped to accommodate the structural element on which the apparatus is to be mounted. In such embodiments, the gripping members are preferably provided on the mounting bracket. In preferred embodiments where the apparatus is adapted to be mounted on a door jamb, the mounting bracket is preferably substantially U-shaped.

The provision of a rigid mounting bracket in such embodiments provides a base for the bladders of the gripping members to bear against during expansion, thus directing the bladders to expand into the gap.

The mounting bracket is preferably provided with a protective insert arranged to bear against said structural element on which the apparatus is to be mounted. Most preferably, said protective insert is formed from resilient non-marking foam and has a thickness in the range of from 10 mm to 20 mm. The protective insert prevents damage or marking of the door jamb or other structural element on which the apparatus is to be mounted.

The strike surface may be attached to the mounting means by any suitable support structure, or may be carried on a shaped member formed from foam or padded fabric.

In a preferred embodiment of the present invention however, the strike surface is carried on an inflatable bladder. The origins of this preferred embodiment of the present invention lie partially in the surprising discovery that sufficient pressure within the inflatable bladder—even to withstand the extreme forces associated with being punched or kicked by a martial arts master—may be attained simply by inflating the or each bladder according to one of these methods.

In other embodiments of the present invention, the inflatable bladder associated with the strike surface may be pre-filled with a shock-absorbing or shock-attenuating gel or other fluid.

The inflatable bladder associated with the strike surface is preferably shaped so as on inflation to adopt a generally cylindrical or global profile. It is further preferred that said bladder comprise one or more strengthening ribs, located internally thereof, in order to impart greater resistance against damage and so prolong the useful life of the apparatus.

In such embodiments of the present invention, in which the strike surface is carried on an inflatable bladder, the generally rigid mounting bracket may be omitted. Instead, the inflatable bladder associated with the strike surface may be inflated prior to mounting the apparatus on a structural element, and can then be pulled apart and sprung back over the structural element. The inflatable bladders associated with the gripping members can then be inflated, and will bear against the already inflated bladder associated with the strike surface, so as to direct their expansion into the gap.

In a second major embodiment of the present invention, the inflatable bladder associated with the strike surface also constitutes the inflatable bladder associated with the mounting means. That is to say, the apparatus is formed with a single inflatable bladder constituting both the support for the strike surface and the mounting means, with no separate gripping members.

Inflation of the or each bladder may be carried out either orally, using conventional air pumps, or by the provision of canisters of pressurised air or other gas. The or each inflatable bladder is preferably provided with an inflation valve located on a side of the apparatus opposite the strike surface. This helps to prevent accidental damage to, or opening, of, the inflation valves during use as a result of being struck by a punch or kick. It is also preferred that each said inflation valve is located so as to be accessible in use when the apparatus is mounted on a structural element. This may conveniently be achieved by locating said each inflation valve centrally of a face of said inflatable bladder distal from the strike surface. The or each inflation valve may desirably be a quick release valve, to facilitate speedy deflation of the device following a training session.

In addition to its use as a static training aid, it is envisaged that the user may wish also to utilise the apparatus of the present invention, in association with a training partner, during the performance of sparring exercise. To this end, certain embodiments of the present invention may further comprise handles or straps to enable said apparatus to be held or worn by a user during sparring exercise.

It is envisaged that the training apparatus of the present invention will be deployed and mounted on a suitable structural element—such as a door frame—within the home when the user wishes to perform a training session, and will then be demounted and collapsed for convenient storage until the next training session. It is further envisaged that the portable nature of the present invention will lend itself to being utilised wherever and whenever required by the user—for example, in the office, in a hotel room, or even outside mounted on a tree or lamp-post etc. Thus, a user engaged in a daily training regime need not interrupt that regime even when away from home or the training gym.

In addition to the above described functionality, certain embodiments of the apparatus according to the present invention may be supplied in combination with a structural element for mounting said apparatus thereon. The structural element may preferably be a purpose built frame.

As described hereinbefore, it is envisaged that the mounting means developed as an integral part of the first aspect of the present invention may itself also find use in a wide range of other applications where it is desired removably to secure apparatus to a structural element.

Therefore, according to a second aspect of the present invention there is provided mounting means for removably securing apparatus to a structural element, said mounting means being shaped and dimensioned so as to receive said structural element, and comprising at least one inflatable bladder adapted upon inflation to cause said mounting means to grip said structural element.

In a first major embodiment of the second aspect of the present invention, the mounting means comprises:
 a pair of opposed gripping members adapted to grip said structural element therebetween; and
 a gap defined between said gripping members, said gap being shaped and dimensioned so as to receive said structural element;
wherein at least one of the gripping members comprises an inflatable bladders adapted upon inflation to cause said gripping member to expand into gap thereby to grip said structural element.

In a second major embodiment of the second aspect of the present invention, the mounting means comprises a single inflatable bladder, and no gripping members.

Other preferred features of the mounting means as hereinbefore described with reference to the first aspect of the present invention should be construed also to constitute preferred embodiments of the mounting means according to the second aspect of the present invention.

In order that the present invention may be more clearly understood, a preferred embodiment thereof will now be described in detail, though only by way of example, with reference to the accompanying drawings, in which.

Figure 1:
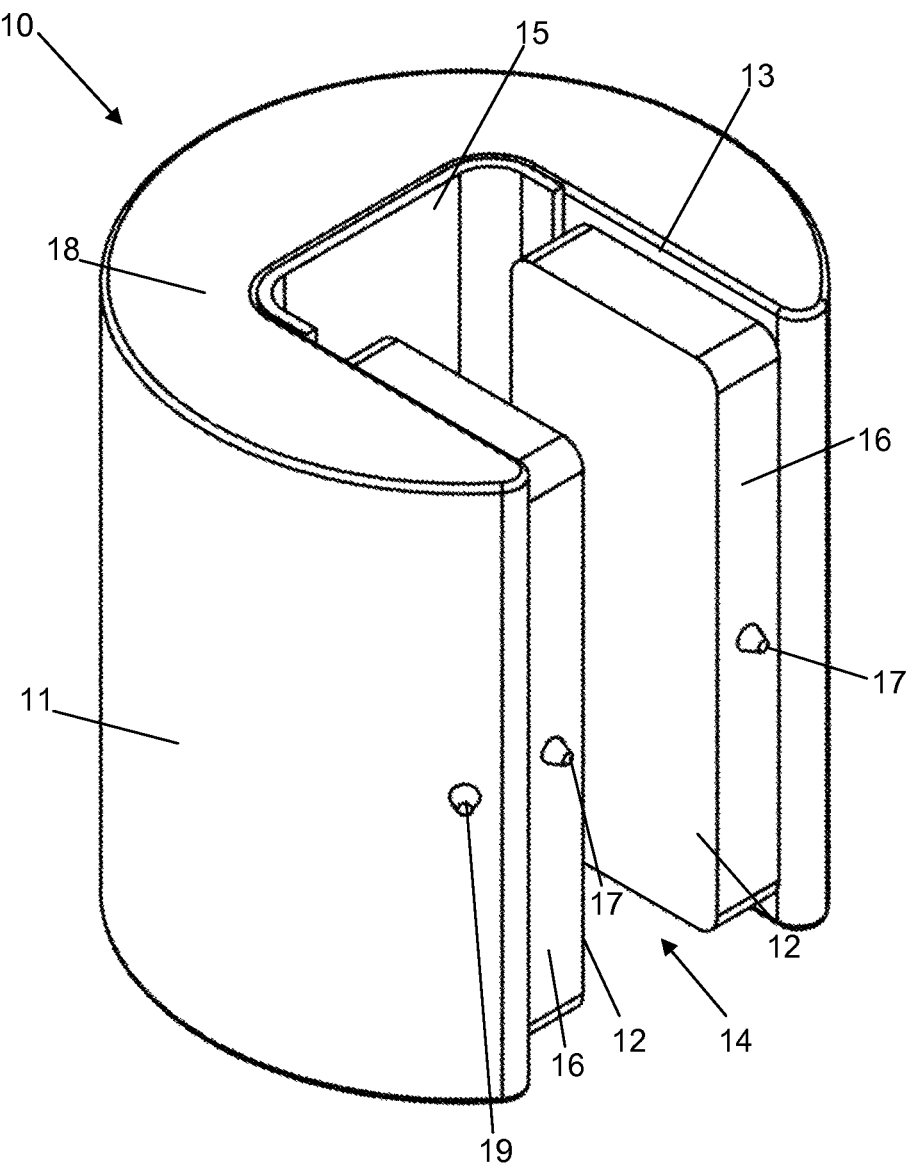
FIG. 1 shows a perspective view of apparatus for use in martial arts or fitness training, according to the present invention.
Figure 2:
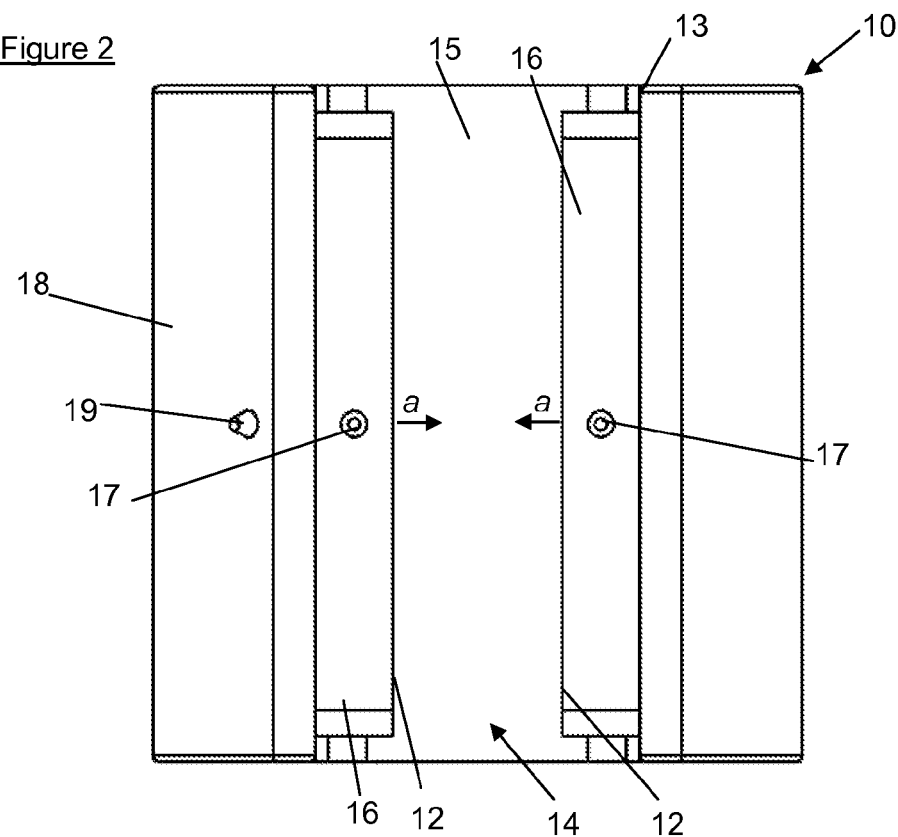
FIG. 2 shows a side view of the apparatus of FIG. 1.
Figure 3:
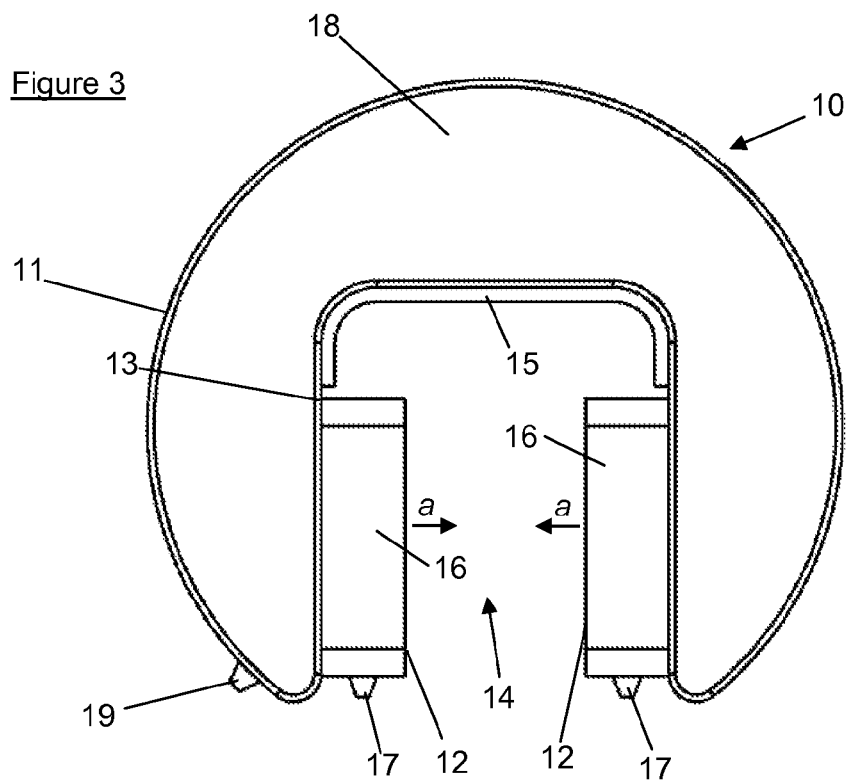
FIG. 3 shows a plan view of the apparatus o FIGS. 1 and 2.

Referring simultaneously to FIGS. 1 to 3, there is shown apparatus, generally indicated 10, for use in martial arts or fitness training. The apparatus 10 has a three-dimensional strike surface 11, which forms a generally cylindrical profile, as can be seen best from FIGS. 1 and 3.

The apparatus 10 is intended to be removably secured to a door jamb (not shown), and for that purposes is provided with mounting means in the form of a pair of opposed gripping members 12. The gripping members 12 are provided on a rigid, generally U-shaped mounting bracket 13, and define a gap, generally indicated 14, between one another. The gap 14 is shaped and dimensioned so as to accommodate substantially all conventional sizes of door jamb. As can best be seen in FIGS. 1 and 3, the centre of the mounting bracket 13 is provided with a protective insert 15 to prevent damage to the door jamb.

Each gripping member 12 has an internal bladder 16 inflatable via an inflation valve 17. By inflating the bladders 16, the gripping members 12 can be caused to expand inwardly into the gap 14, as illustrated by arrows a in FIGS. 2 and 3. The rigid mounting bracket 13 provides a base for the bladders 16 to bear against during expansion, thus directing the bladders 16 to expand only in direction a. Inflation of the bladders 15 is continued until the gripping members 12 securely grip a door jamb located in the gap 14.

The strike surface 11 is also carried on a larger bladder 18 inflatable via a further inflation valve 19. As can be appreciated best from FIG. 3, the inflation bladder 18 associated with the strike surface 11 constitutes the majority of the volume of the apparatus 10, when the apparatus is fully inflated. Although not shown in FIGS. 1 to 3, the bladder 18 may desirably be provided with internal strengthening ribs.

As can be seen from FIGS. 1 and 3 in particular, the inflation valves 17, 19 are located distally from the centre of the strike surface 11, where the majority of punches and kicks will be directed during a training session. That is to say, the valves 17, 19 are located on the side of the apparatus which will be proximal to the door jamb, when in use. This prevents damage to the valves 17, 19, and accidental deflation, caused by the valves 17, 19 being struck. As can be seen from FIG. 2, the valves 17, 19 are provided centrally in the face of each bladder 16, 18 facing the door jamb. This provides ease of access for inflation, deflation and topping-up during use if required.

The invention claimed is:

1. Apparatus for use in martial arts training, comprising:
   a strike surface adapted to be struck by a user during training;
   a strike surface inflatable bladder on which the strike surface is carried, the strike surface inflatable bladder being shaped so as on inflation to adopt a profile selected from the group consisting of generally cylindrical and generally global, and comprising at least one strengthening rib located internal to the strike surface inflatable bladder; and
   mounting means adapted for removably securing the strike surface to a door frame, said mounting means comprising a pair of opposed gripping members adapted to grip said door frame therebetween, and a gap defined between the gripping members, said gap being shaped and dimensioned so as to receive said door frame, and wherein at least one of the gripping members comprises an inflatable bladder different from the strike surface inflatable bladder and adapted upon inflation to cause said gripping member to expand into the gap, thereby to grip said door frame.

2. The apparatus as claimed in claim 1, wherein the strike surface is three-dimensional and has a generally cylindrical profile.

3. The apparatus as claimed in claim 1, wherein each gripping member comprises an inflatable bladder.

4. The apparatus as claimed in claim 1, wherein the mounting means further comprises a mounting bracket shaped to accommodate said door frame on which the apparatus is to be mounted.

5. The apparatus as claimed in claim 4, wherein gripping members are provided on the mounting bracket.

6. The apparatus as claimed in claim 4, wherein the mounting bracket is provided with a protective insert arranged to bear against said door frame on which the apparatus is to be mounted.

7. The apparatus as claimed in claim 1, wherein the strike surface inflatable bladder is provided with an inflation valve located on a side of the apparatus opposite the strike surface so as to be accessible in use when the apparatus is mounted on the door frame.

8. Mounting means for removably securing an apparatus to a door frame, wherein said apparatus comprises an apparatus inflatable bladder shaped so as on inflation to adopt a profile selected from the group consisting of generally cylindrical and generally global, and comprising at least one strengthening rib located internal to the apparatus inflatable bladder;
   said mounting means comprising a pair of opposed gripping members adapted to grip said door frame therebetween, and a gap defined between said gripping members, said qap being shaped and dimensioned so as to receive said door frame, and wherein at least one of the gripping members comprises an inflatable bladder different from the apparatus inflatable bladder and adapted upon inflation to cause said gripping member to expand into the gap thereby to grip said door frame.

9. The mounting means as claimed in claim 8, wherein each gripping member comprises an inflatable bladder.

10. The mounting means as claimed in claim 8, wherein each gripping member is provided with a high friction surface to facilitate gripping of said door frame.

11. The mounting means as claimed in claim 8 further comprising a mounting bracket shaped to accommodate said door frame on which the apparatus is to be mounted.

12. The mounting means as claimed in claim 11, wherein gripping members are provided on the mounting bracket.

13. The mounting means as claimed in claim 11, wherein the mounting bracket is provided with a protective insert arranged to bear against said door frame on which the apparatus is to be mounted.

14. The mounting means as claimed in claim 8, wherein the apparatus inflatable bladder is provided with an inflation valve located so as to be accessible in use when the apparatus is mounted on the door frame.

\* \* \* \* \*